(12) United States Patent
Siegel

(10) Patent No.: US 9,005,688 B2
(45) Date of Patent: Apr. 14, 2015

(54) THERMALLY STABLE HIGH IMPACT FLAVORING PARTICLES

(75) Inventor: Sven Siegel, Höxter (DE)

(73) Assignee: Symrise AG, Holzminden (DE)

( * ) Notice: Subject to any disclaimer, the term of this patent is extended or adjusted under 35 U.S.C. 154(b) by 469 days.

(21) Appl. No.: 13/287,517

(22) Filed: Nov. 2, 2011

(65) Prior Publication Data

US 2012/0107477 A1     May 3, 2012

Related U.S. Application Data

(60) Provisional application No. 61/409,214, filed on Nov. 2, 2010.

(51) Int. Cl.
| | | |
|---|---|---|
| *A23L 1/22* | (2006.01) | |
| *A23L 1/09* | (2006.01) | |
| *A23L 3/00* | (2006.01) | |
| *A23L 1/00* | (2006.01) | |
| *C08B 30/18* | (2006.01) | |
| *C08L 3/02* | (2006.01) | |

(52) U.S. Cl.
CPC . *A23L 1/095* (2013.01); *A23L 3/00* (2013.01); *A23L 1/0029* (2013.01); *A23L 1/22016* (2013.01); *C08B 30/18* (2013.01); *C08L 3/02* (2013.01)

(58) Field of Classification Search
CPC ... A23L 1/0029; A23L 1/095; A23L 1/22016; C08B 30/18; C08L 3/02
USPC ......... 426/534, 535, 536, 537, 538, 650, 658, 426/661; 536/103
See application file for complete search history.

(56) References Cited

U.S. PATENT DOCUMENTS

2010/0196542 A1     8/2010   Boursier

FOREIGN PATENT DOCUMENTS

| EP | 0673605 A1 | 9/1995 |
| EP | 0846704 A2 | 6/1998 |
| EP | 1362869 A1 | 11/2003 |
| WO | WO-2006106519 A2 | 10/2006 |
| WO | WO-2006106520 A2 | 10/2006 |
| WO | WO-2011147455 A1 | 12/2011 |

*Primary Examiner* — Leslie Wong
(74) *Attorney, Agent, or Firm* — Dilworth & Barrese, LLP

(57) ABSTRACT

The present invention relates to inclusion products containing or consisting of one or a plurality of flavoring materials and a maltodextrin fraction. Moreover, a production process for said inclusion products is provided according to the invention. The invention further relates to maltodextrin fractions, in particular those that are suitable for preparing inclusion products according to the invention, and corresponding use of maltodextrin fractions according to the invention.

20 Claims, No Drawings

THERMALLY STABLE HIGH IMPACT FLAVORING PARTICLES

CROSS-REFERENCE TO RELATED APPLICATIONS

This application claims priority under 35 U.S.C. §119(e) to U.S. provisional application No. 61/409,214, filed Nov. 2, 2010, the entire contents of which is hereby incorporated by reference.

BACKGROUND OF THE INVENTION

The present invention relates to inclusion products containing or consisting of one or a plurality of flavoring materials and a maltodextrin fraction, and preparations or semi-finished products containing said inclusion products to be used for nutrition or for pleasure. A method for preparing inclusion products according to the invention is also provided according to the invention. The invention further relates to maltodextrin fractions, in particular those that are suitable for preparing inclusion products according to the invention, and corresponding uses of maltodextrin fractions according to the invention.

Flavoring materials are mainly volatile compounds, which have high loss rates during storage or during processing in the food industry, for example through volatilization, evaporation, vaporization, steam distillation and oxidation. Owing to these aforementioned and other negative circumstances, in the most varied of applications, flavoring materials often have inadequate stability, so that for example the intensity of flavor perceived during consumption may decrease, the flavor profile may change and there may possibly be formation of off-flavors with an undesirable taste.

For stabilization of flavoring materials, in the known prior art mainly additives, for example antioxidants are included, and/or the flavoring materials are protected by encapsulation. However, additives should only be used if their use is absolutely necessary, and even then the amount used should be as small as possible. Moreover, antioxidants as such do not as a rule contribute to a decrease in volatility of flavoring materials.

In food technology there is a constant need to stabilize flavorings against processing steps. It is important in particular to provide flavorings that remain stable at the high temperatures usually employed in food processing and that do not lose their intensity or form any undesirable off-flavors. For supplying suitably stabilized flavorings there is sometimes an attempt to encapsulate them in the most varied materials, for example by absorption in yeast ghosts, or by inclusion or dispersion in a carrier matrix.

US 2010/196542 A1 discloses a method of encapsulation in which leguminous starch is processed to a maltodextrin fraction and/or glucose syrup and is used for encapsulating hydrophobic organic compounds. The compounds can be mixed with the maltodextrin fraction and/or dehydrogenated glucose syrup in a kneader. However, this has the disadvantage that the further processing of highly viscous kneaded masses is costly, and this also applies in particular to drying thereof on an industrial scale, i.e. in the preparation of amounts of product of more than 20 kg, preferably more than 50 kg and particularly preferably more than 100 kg. A process is also described for spray-dried limonene, wherein the limonene is taken up in an aqueous solution of an emulsifier and of the maltodextrin fraction and/or glucose syrup. The water content of the mixture prior to spray-drying is not stated. No inclusion compounds in the sense of this invention are formed.

WO2006/106519 A2 and WO 2006/106520 A2 each disclose hydrophilic dispersions, which contain nanoparticles of a hydrophilic inclusion complex with active substances, and the production of said dispersions. With the starting substances and methods stated therein it is not, however, possible to produce any inclusion compounds that can be dried extremely economically. In fact, the starting substances used lead to high viscosity in water, so that during production with the usual food processing equipment it is necessary to use a large amount of water. This has to be removed, which leads to large losses of active substances and/or high energy consumption.

PCT/EP2010/057365 discloses the preparation of inclusion compounds of flavoring materials with polymers of glucose and/or glucose-like monomers.

In addition to the usually high water content that is required or, at low water content, the high viscosity of the materials to be processed for including flavorings in carriers and therefore the economically disadvantageous manner of preparing said inclusion products, another disadvantage is that flavorings encapsulated in this way are as a rule released very slowly during consumption, so that the perception of flavor in the first few seconds of consumption (also called "flavor impact") is slight. However, at the time of consumption, the flavor should be perceived as quickly as possible, in order to produce a good impression.

Impact in the sense of this invention is defined as the quotient of the intensity of flavor of an encapsulated flavoring material to the intensity of flavor of the unencapsulated (original) flavoring materials, the flavor intensities being determined as follows. The intensity of flavor of the original flavoring materials (or mixtures thereof) is determined at a usual dosage in 10 ml water (20° C.) by tasting on a scale from 1 to 10, where 1=not perceptible and 10=extremely strong. The intensity of flavor is determined 3 seconds after taking in, without swallowing the sample. After neutralization of taste, the sample is tasted with the sample of the encapsulated flavoring material to be investigated. The sample quantity is to be established so that the sample contains overall the same amount of flavoring material as the original flavoring material that was tasted first. The sample is put in 10 ml water (20° C.), immediately stirred vigorously for 10 seconds with a spatula and then tasted immediately. The intensity of flavor is also determined 3 seconds after taking in. According to the invention, the impact determined in this way is preferably >0.5, particularly preferably >0.7 and quite particularly preferably >0.85.

SUMMARY OF THE INVENTION

Therefore the object to be achieved by the present invention was to provide flavorings in such a way that during storage and processing in and to foodstuffs, they only suffer slight losses and/or only develop slight or preferably no off-flavors. Furthermore, the flavorings should have a high flavor impact. In particular, corresponding dosage forms should be provided for heat-sensitive flavorings. Furthermore, another object to be achieved by the invention was to provide means for preparing dosage forms according to the invention and methods of preparation for preparing dosage forms according to the invention. Further advantages of the invention are also described below.

Therefore according to the invention a retrograding isolated maltodextrin fraction is provided, characterized in that a) at a temperature of 50-100° C. and 1013 hPa and a pH from 7, the isolated maltodextrin fraction is soluble in water to more than 95 wt. %, preferably is soluble in water to more than 99 wt. %, and/or b) a dispersion of 25 wt. % of the isolated maltodextrin fraction in 75 wt. % water, pH7, after retrogradation and storage at rest for 24 h at 5° C., has a viscosity of 10-500 mPas, preferably of 20-400 mPas, more preferably of 30-200 mPas and particularly preferably of 30-150 mPas, in each case measured at 25° C., 1013 hPa with a plate-on-plate viscosimeter and a shear rate of 1000 s$^{-1}$.

The viscosity is preferably determined with a Bohlin CVO1000 viscosimeter.

The maltodextrin fraction isolated according to the invention has a number of advantages, which makes it particularly suitable for preparing flavoring material inclusion products. In particular, at a temperature of max. 100° C. the maltodextrin fraction is practically completely water-soluble, without requiring a high pressure and/or a high pH for dissolving the maltodextrin fraction in water. This makes it possible, as described hereunder, for flavor-inclusion products to be prepared economically even with flavorings that are particularly temperature-sensitive and/or alkali-sensitive. The method for determining the solubility of the maltodextrin fraction in water is described in more detail below. Compared with a non-isolated maltodextrin fraction, the isolated maltodextrin fraction according to the invention has the advantage that because of the practically complete absence of non-retrograding maltodextrin and insoluble maltodextrin or insoluble starch, the viscosity of an aqueous solution of the maltodextrin fraction remains low even in standard conditions (25° C., 1013 hPa) and it can therefore be processed easily, and practically the whole proportion of maltodextrin fraction can be used for including or encapsulating flavorings. This gives rise to a high yield of included or otherwise encapsulated flavoring materials when carrying out an encapsulation process or inclusion process according to the invention.

A retrograded maltodextrin fraction is also provided according to the invention, prepared or preparable by a process comprising the steps:

(i) providing a maltodextrin with a DE value of 7-14, preferably of 8-13, more preferably of 9-12 and particularly preferably of 9-11, (ii) preparing a 15-70 wt. % solution of the maltodextrin in water at a temperature of 10-100° C. and a pH of 5-9, preferably a 25-65 wt. % solution and particularly preferably a 35-55 wt. % solution, and more preferably at a temperature of 15-80° C., and more preferably at a pH of 6-8, particularly preferably of 6-7, (iii) retrogradation at a temperature from −5 through 30° C. over a period of 1-48 h, preferably at a temperature from −5 through 20° C. and particularly preferably at a temperature of 0-15° C., and further preferably over a period of 2-24 h, particularly preferably of 3-16 h, (iv) separating the retrograded maltodextrin fraction.

A retrograded maltodextrin fraction prepared in this way advantageously has the properties described above (a) and/or (b) of a retrograding isolated maltodextrin fraction according to the invention. It therefore achieves the advantages of a retrograding isolated maltodextrin fraction according to the invention. Hereinafter, therefore, no distinction will be made between a retrograding maltodextrin fraction according to the invention and a retrograded maltodextrin fraction according to the invention. If discussing a retrograding maltodextrin fraction according to the invention, it can in particular be a retrograded maltodextrin fraction according to the invention, and vice versa.

DESCRIPTION OF THE PREFERRED EMBODIMENTS

To prepare a maltodextrin fraction according to the invention, preferably a starch is hydrolyzed. The hydrolysis of starch is a process that is familiar to a person skilled in the art and takes place for example by means of acids or enzymes, in particular alpha- or beta-amylases.

The starch to be hydrolyzed is preferably starch from rice, wheat, barley, rye, oats, legumes and in particular peas, potatoes, tapioca, manioc, maize or mixtures of two or a plurality of said starches. Potato starch is particularly preferred, because with this it is possible to achieve high yields and a particularly low viscosity after retrogradation (property b above).

Maltodextrin derived from hydrolysis preferably has a dextrose equivalent value ("DE value") of 7-14, preferably of 8-13, more preferably of 9-12 and particularly preferably of 9-11. In the context of the invention, it was found that maltodextrins with a higher DE value are not very suitable for obtaining retrograding maltodextrin fractions. Either it is not possible to obtain maltodextrin fractions from these maltodextrins, or the yields of the maltodextrin fractions are very low. It was also found that maltodextrins with a lower DE value form retrograding fractions that cannot be dissolved as described above in a) practically completely in water at max. 100° C., 1013 hPa and a pH of 7, and/or which, contrary to the above property b), after redissolving and retrogradation in water, form highly viscous dispersions.

The DE value is a measure of the degree of degradation of starch. Low DE values are characteristic of starch degradation products with comparatively high average molecular weight, while high DE values characterize starch degradation products with low average molecular weight. The DE value is determined from the reducing capacity of the starch degradation products. The method according to Lane-Eynon is employed for determining the DE value. A detailed description of the method is given in Hoffmann, H., Mauch, W., Untze W.: Zucker and Zuckerwaren [Sugar and sugar products], 2nd edition, 1st reprint 2004, p. 234ff.

Maltodextrin with a DE value of 7-14, or one of the preferred DE values can be provided in dry form or as aqueous solution. If it is provided as solution, it is concentrated or diluted according to the proportions according to the invention from step (ii). If a maltodextrin solution with the properties (maltodextrin dry content, pH and temperature) defined in step (ii) is already provided, steps (i) and (ii) are combined. These methods of preparation are also according to the invention.

The dry content of the maltodextrin is adjusted in step (ii) to 15-70 wt. %, preferably to 25-65 wt. % of the total solution, particularly preferably to 35-55 wt. %. At these dry contents, both a high yield of maltodextrin fraction relative to the total mass of maltodextrin used with a DE value of 7-14 is achieved, and a high yield of retrograded maltodextrin according to the invention relative to the total mass of the solution produced in step (ii), so that a high yield per batch is achieved.

The pH value of the maltodextrin solution prepared in step (ii) is 5-9, preferably 6-8 and particularly preferably 6-7. These values have proved to be particularly advantageous according to the invention, because at higher pH values the yield of retrograded maltodextrin with 24-hour storage at 15° C. and 1013 hPa has proved to be uneconomically low, whereas at lower pH there is continued hydrolysis of maltodextrin and for example of potato starch, which is particularly preferred for maltodextrin preparation. The solution provided in step (ii) is preferably prepared at ambient pressure.

Retrogradation for obtaining a retrograded maltodextrin fraction according to the invention preferably takes place at a temperature up to max. 30° C., in particular preferably from −5 through 30° C., more preferably at a temperature from −5 through 20° C. and particularly preferably at a temperature from 0 through 15° C. It has been found according to the invention that the yield of retrograded maltodextrin according to the invention decreases with higher temperatures and could not be carried out economically within the desired time according to the invention up to a maximum of 48 h, preferably max. 24 h and particularly preferably max. 16 h.

Therefore a method for preparing a retrograded maltodextrin fraction according to the invention and a corresponding retrograded maltodextrin according to the invention that has been prepared or is preparable is preferred, wherein in step (ii) a solution with the following parameters is prepared (in increasing order according to the rank of preference and development of the advantages attainable according to the invention):

| Rank | Maltodextrin (DE value), preferably from potato starch | Proportion of maltodextrin (wt. %) | pH | Temperature |
|---|---|---|---|---|
| 1 | 7-14 | 15-70 | 5-9 | 10-100 |
| 2 | 7-14 | 15-70 | 6-8 | 10-100 |
| 3 | 7-14 | 15-70 | 6-8 | 15-80 |
| 4 | 7-14 | 15-70 | 6-8 | 50-80 |
| 5 | 8-13 | 25-65 | 5-9 | 10-100 |
| 6 | 8-13 | 25-65 | 6-8 | 10-100 |
| 7 | 8-13 | 25-65 | 6-8 | 15-80 |
| 8 | 8-13 | 25-65 | 6-8 | 50-80 |
| 9 | 8-13 | 35-55 | 6-7 | 15-80 |
| 10 | 9-12 | 25-65 | 5-9 | 10-100 |
| 11 | 9-12 | 25-65 | 6-8 | 15-80 |
| 12 | 9-12 | 25-65 | 6-8 | 50-80 |
| 13 | 9-12 | 25-65 | 6-7 | 15-80 |
| 14 | 9-12 | 35-55 | 6-8 | 15-80 |
| 15 | 9-12 | 35-55 | 6-7 | 50-80 |
| 16 | 10 | 15-70 | 5-9 | 10-100 |
| 17 | 10 | 25-65 | 6-8 | 10-100 |
| 18 | 10 | 25-65 | 6-8 | 15-80 |
| 19 | 10 | 25-65 | 6-7 | 15-80 |
| 20 | 10 | 35-65 | 6-7 | 50-80 |

Thus, in the above table, a combination of parameters with higher rank number is preferable to a combination with lower rank number. In particular the advantages of the invention can be achieved with the more preferred combinations more economically and more quickly in production. In step (iv), the retrograded maltodextrin is separated by suitable methods of separation, for example by centrifugation, sedimentation and/or filtration. The retrograded maltodextrin can optionally be made into a slurry again in water with a temperature up to 15° C. and a pH of 5-9, wherein once again a pH of 6-8 is preferred and a pH of 6-7 is particularly preferred. After the optional slurrying, the retrograded maltodextrin can be separated again and therefore purified.

A maltodextrin fraction according to the invention, that is, an isolated retrograding maltodextrin fraction with the above properties in a) and/or b) and/or a retrograded maltodextrin fraction according to the invention preferably has a (residual) content of non-retrograding maltodextrin of max. 30 wt. %, preferably from 0.2 through 20 wt. % and particularly preferably from 0.3 to 10 wt. % in each case relative to the total maltodextrin fraction. A maltodextrin is regarded as non-retrograding if, at a pH of 5-7 and a temperature of 15° C., it is not precipitated within 48 h from a 65 wt. % aqueous solution. Maltodextrin fractions with a low content of non-retrograding maltodextrin as described above can easily be prepared with the production process according to the invention with the steps (i) to (iv) described above. Owing to the low proportion of non-retrograding maltodextrin, the maltodextrin fraction according to the invention can be used almost completely for preparing an inclusion product according to the invention. This permits particularly simple and economical incorporation of flavorings.

The water content of a maltodextrin fraction according to the invention is preferably 5-10 wt. % relative to the total of water and maltodextrin fraction dry matter. Used in the context of this invention, dry matter or dry content of maltodextrin means the amount of maltodextrin that is obtained when aqueous maltodextrin is dried to constant weight in a circulating-air drying cabinet at a temperature of 105° C.

A retrograded maltodextrin fraction according to the invention or isolated retrograding maltodextrin according to the invention with a water content up to 10 wt. % is suitable directly for preparing an inclusion product according to the invention. At the tolerable water content, moreover, the energy expenditure for producing a pourable maltodextrin according to the invention can be kept advantageously low. Preferably the retrograded maltodextrin fraction according to the invention or the isolated retrograding maltodextrin according to the invention is dried to a water content of max. 10 wt. %, preferably from 5 through 10 wt. % by spray-drying and/or drum drying.

As an alternative, the retrograding isolated maltodextrin fraction according to the invention or the retrograded maltodextrin fraction according to the invention can also be dried to lower water contents up to max. 10 wt. %, for example by spray-drying or drum drying.

A retrograding maltodextrin fraction according to the invention or retrograded maltodextrin fraction is preferably characterized in that a 25 wt. % mixture of the maltodextrin fraction in water (relative to the dry content of maltodextrin) at pH 7, 100° C. and 1013 hPa in equilibrium has a content of at least 95 wt. % of dissolved maltodextrin fraction, preferably of at least 99 wt. %. This applies in particular to a maltodextrin fraction according to the invention with a (residual) content of non-retrograding maltodextrin indicated above as preferred. The proportion of dissolved maltodextrin fraction can be determined according to the invention by a method with the steps:

(i) prepare a dispersion from 12.5 g of the maltodextrin fraction (dried to constant weight at 105° C. in the circulating-air cabinet) in 37.5 g water at a pH of 7,
(ii) heat the dispersion to 100° C. at 1013 hPa to dissolve the maltodextrin fraction,
(iii) leave the heated mixture to cool to 50° C.,
(iv) centrifuge the cooled mixture at 12000 g for 15 min,
(v) decant the supernatant,
(vi) slurry the sediment with 37.5 g water with a temperature of 5° C. and a pH of 7, and centrifuge the slurry at 12000 g for 15 min, then decant the supernatant,
(vii) repeat step (vi),
(viii) dry the sediment obtained in step (vii) to constant weight at 105° C. in a circulating-air drying cabinet and weigh the dried sediment.

In this way, the proportion of undissolved maltodextrin in the maltodextrin fraction is determined. If this proportion is deducted from the total amount of maltodextrin used in step (i), this gives the proportion of maltodextrin fraction that is water-soluble at pH 7, 100° C. and 1013 hPa.

The determination procedure is preferably used, in particular in the case of the maltodextrin fractions according to the invention indicated above as preferred.

According to the invention, furthermore a solution of maltodextrin fraction is provided with a water content of 50-95 wt. %, preferably with a water content of 60-85 wt. % and particularly preferably of 70-80 wt. %, in each case relative to the sum of the dry weight of maltodextrin and water, wherein the maltodextrin in the solution of maltodextrin fraction is a maltodextrin fraction according to the invention, i.e. a retrograded maltodextrin fraction according to the invention or a retrograding isolated maltodextrin fraction according to the invention. Said solution of maltodextrin fraction according to the invention is particularly advantageous, as is described in connection with the method according to the invention for preparing an inclusion product according to the invention.

It is particularly advantageous if the solution of maltodextrin fraction according to the invention is at a temperature of 50-100° C. and a pressure of 800-1080 hPa, particularly preferably at a temperature of 60-90° C. and particularly preferably at a temperature of 70-80° C., in each case referring to a pressure of 1013 hPa. In these conditions, even temperature-sensitive flavorings can, as was discovered according to the invention, be processed particularly efficiently into inclusion products.

It has been found to be particularly beneficial in the sense of economical execution of a production process according to the invention for an inclusion product, if the maltodextrin fraction of the solution of maltodextrin fraction is dissolved to at least 70 wt. % relative to the dry content of maltodextrin in the maltodextrin fraction according to the invention and water, preferably to at least 80 wt. %, more preferably to at least 90 wt. % and particularly preferably to at least 99 wt. %. The content of undissolved maltodextrin fraction is determined as described above.

According to the invention, furthermore an inclusion product is provided, containing or consisting of one or a plurality of flavoring materials and a maltodextrin fraction according to the invention, (preferably a maltodextrin fraction according to the invention indicated above as preferred) characterized in that the product
- has a content of 60-99.8 wt. % of maltodextrin fraction according to the invention, preferably 65-99 wt. % and particularly preferably 70-98 wt. %,
- a content of 0.1-10 wt. % of included flavoring material or included flavoring materials, preferably 0.2-8 wt. % and particularly preferably 0.6-6 wt. %, and
- a content of 0.1-30 wt. % of dispersed flavoring material or dispersed flavoring materials, preferably 0.8-27 wt. % and particularly preferably 1.4-24 wt. %,
- in each case relative to the total content of maltodextrin fraction dry weight, included and dispersed flavoring materials.

The flavoring material inclusion products according to the invention described above (and in particular the preferred embodiments thereof described below) have numerous advantages. Thus, the flavoring materials included therein are for example protected particularly against volatilization, oxidation and flavoring material/flavoring material reactions. Inclusion of the flavoring materials advantageously provides in particular protection against negative factors such as volatilization, evaporation, vaporization, steam distillation, UV radiation, thermal stress, pressure and oxidation. Further advantages of the flavoring material inclusion products according to the invention are that starch, and the maltodextrin according to the invention, being of wide occurrence in nature, is available practically everywhere and in very large amounts, as plant raw material is also suitable for a vegetarian diet, has a neutral intrinsic taste, has a regulating effect on digestion and other positive health effects are under discussion. With all the aforementioned advantages, the use of a maltodextrin fraction according to the invention is very economical. In combination with the method according to the invention (see below), stabilization of flavoring materials can advantageously be achieved without adding antioxidants.

The flavoring material inclusion products according to the invention provide particularly good stabilization of the included flavoring materials. The flavoring material inclusion products according to the invention can advantageously be stored for a longer period without any large loss of flavoring materials. The flavor profile of flavoring material inclusion celluloses according to the invention can therefore be kept constant over a longer period.

Moreover, advantageously, high stability is provided during foodstuff processing or preparation. The flavoring material inclusion products according to the invention can therefore be used for example in heating, baking, roasting, frying, boiling, stewing, braising, grilling, steaming, pasteurizing, sterilizing, extrusion, conching, sprinkling-on, sprinkling-in, stirring-in, mixing (wet/moist or dry), blending, kneading, foaming, melting, solidifying, drying, dispersing of foodstuffs. With the flavoring material inclusion products according to the invention, in particular losses and undesirable reactions of the (included) flavoring materials can be reduced or even excluded. Also during storage, transport and when keeping cooked or semi-cooked foods ready for example in canteens, restaurants, catering establishments, forwarding companies, warehouses and supermarkets, and by the consumer, the flavoring material inclusion products according to the invention can contribute to the stabilization of the flavoring materials. Surprisingly, the flavoring material inclusion products according to the invention, despite the high stability, in particular during consumption allow the included flavoring materials to be released, so that they can be clearly perceived by the consumer. The flavoring material inclusion products according to the invention are therefore suitable in particular for "delivery on demand". The flavoring material inclusion products according to the invention can also be used for prolonging the release of the flavoring material, and use in chewing gums is particularly important. Moreover, a flavoring material inclusion product according to the invention can, depending on the flavoring materials included, be used for special applications in food processing, to flavor a foodstuff or to mask substances with an unpleasant taste. Preparations and semi-finished products according to the invention to be used for nutrition or for pleasure are described below.

Moreover, it was found, surprisingly, that the flavoring material inclusion products according to the invention are used for prolonging release of the flavoring materials, without lowering the impact (as defined initially) below 0.5, preferably not below 0.8. This was unexpected; rather, it was to be assumed that with slower release of flavoring materials, only a lower impact would be achievable. Accordingly, an inclusion product according to the invention is provided with an impact of at least 0.5, preferably of at least 0.8.

In addition, an inclusion product according to the invention can be prepared particularly simply, economically and preserving the flavoring material, with production of highly viscous aqueous dispersions, high temperatures and/or pH values above 9 being unnecessary.

The content of included flavoring material I (i.e. the content of included flavoring materials) of a sample of a flavoring-material inclusion product (according to the invention) can be calculated from:

$$I = X * \left(1 - \frac{A2(t=0)}{A1(t=0)}\right)$$

with
I=content of included flavoring material
X=total content of flavoring material=mass of flavoring materials/(mass of flavoring materials+mass of maltodextrin fraction)
and
$A2(t=0)$=initial amplitude of the sample at time point t=0
$A1(t=0)$=initial amplitude of the flavoring materials without maltodextrin fraction at time point t=0, wherein the amount of flavoring material corresponds to the total amount of flavoring material from the flavoring material cellulose sample or the flavoring material inclusion cellulose sample.

For determining the total content of flavoring material X (i.e. content of included and non-included flavoring materials) of a sample, it is possible in particular to use distillation-based and extractive sample preparation or combinations thereof. In particular, sample preparation takes place by simultaneous distillation and extraction (SDE), the execution of which is known by a person skilled in the art. It is to be borne in mind that extraction of the flavoring materials is to be exhaustive, therefore preparation should take at least 4 hours. Gas chromatography can be used for quantification.

Usually, for determining $A1(t=0)$ and $A2(t=0)$, the usual procedure is to determine the total content of flavoring material X in a test sample. $A1(t=0)$ and $A2(t=0)$ are determined with an NMR instrument, e.g. the Minispec Mq 20 from the company Bruker. First it is necessary to determine how much weighed sample m(sample) fits in a sample tube. This varies depending on the bulk density of the sample and is usually 1 to 2 g. Based on the mass m(sample), the mass of the flavoring materials contained therein m(flavoring material) is calculated from the total content of flavoring material X. An equivalent amount of these flavoring materials (without maltodextrin fraction) is weighed with the mass m(flavoring material) in a separate sample tube and is put in the sample shaft of the NMR instrument. The NMR experiment uses a 90° pulse, followed by 180° pulses in each case with an interval of approx. 1.5 ms (liquid echo). The evaluations take place in the time domain. The initial amplitude is determined via a biexponential regression. The signal amplification (gain) of the instrument is adjusted so that $A1(t=0)$ of the flavoring material sample is approx. 75+/−10% of the maximum value of the signal intensity that can be represented. This setting of the signal amplification is adopted for determining $A1(t=0)$ and $A2(t=0)$. After determining $A1(t=0)$, $A2(t=0)$ of the mass m(sample) of the sample is determined. Particular attention is required to ensure that the flavoring materials (without maltodextrin fraction) and the sample are at the same temperature.

An inclusion product according to the invention is prepared or preparable by a process comprising the steps:
(i) preparing a mixture of a retrograding isolated maltodextrin fraction according to the invention or retrograded maltodextrin fraction in water at a pH of 5-9, wherein the content of maltodextrin fraction (dry content) in the mixture is 5-50 wt. %, preferably 15-40 wt. % and particularly preferably 20-30 wt. %, and wherein the pH is preferably 6-8, particularly preferably of 6-7,
(ii) dissolving the maltodextrin fraction of the mixture prepared in step (i) by heating the mixture to 50-100° C. at max. 1080 hPa, so that at least 70 wt. % of the maltodextrin fraction is dissolved,
(iii) allowing the solution obtained in step (ii) to cool to a temperature of max. 1-30° C. to produce a dispersion of retrograded maltodextrin, preferably to a temperature of 5-20° C. and particularly preferably of 5-15° C., and
(iv) adding flavoring material to be included or flavoring materials to be included to the solution before or during step (iii).

A production process according to the invention and an inclusion product that is preparable or has been prepared in this way are particularly preferred in which
step (iv) is carried out in such a way that the ratio of total added flavoring materials to maltodextrin fraction (dry) is 0.01:1 through 2:1, preferably 0.05:1 through 1:1 and particularly preferably 0.07:1 through 0.5:1, and/or
step (iv) is carried out in such a way that the ratio of total added flavoring materials to maltodextrin fraction (based on their dry weight) is 0.01:1 to 2:1, preferably 0.05:1 to 1:1 and particularly preferably 0.07:1 to 0.5:1.

The term flavoring materials is used in the present invention in the sense of EEC Directive 88/388/EEC of 22 Jun. 1988, published in the ABl. L 184 of 15 Jul. 1988, p. 61. Flavoring materials are, according to this directive:

"defined chemical substances with flavoring properties, which are obtained as follows:
i) by suitable physical methods (including distillation and solvent extraction) or enzymatic or microbiological methods from substances of plant or animal origin, which are used as such or are processed by traditional methods of food preparation (including drying, roasting and fermentation) for human consumption;
ii) by chemical synthesis or by isolation using chemical techniques, wherein their chemical nature is identical to a substance that occurs naturally in a substance of plant or animal origin in the sense of clause i);
iii) by chemical synthesis, but wherein their chemical nature is not identical to a substance that occurs naturally in a substance of plant or animal origin in the sense of clause i)."

Flavoring materials in the sense of this definition occur in particular in the following extracts, essential oils, concretes, absolutes, resins, resinoids, balsams or tinctures: amyris oil; angelica seed oil; angelica root oil; anise oil; valerian oil; basil oil; tree moss absolute; bay oil; mugwort oil; benzoic resin; bergamot oil; beeswax absolute; birch tar oil; bitter almond oil; savory oil; buchu leaf oil; cabreuva oil; cade oil; calamus oil; camphor oil; cananga oil; cardamom oil; cascarilla oil; cassia oil; cassia absolute; castoreum absolute; cedar leaf oil; cedar wood oil; cistus oil; citronella oil; lemon oil; copaiba balsam; copaiba balsam oil; coriander oil; costus root oil; cumin oil; cypress oil; davana oil; dill oil; dill seed oil; oak moss absolute; elemi oil; tarragon oil; eucalyptus-citriodora oil; eucalyptus oil; fennel oil; spruce needle oil; galbanum oil; galbanum resin; geranium oil; grapefruit oil; guaiac wood oil; gurjun balsam; gurjun balsam oil; helichrysum absolute; helichrysum oil; ginger oil; iris root absolute; iris root oil; jasmine absolute; calamus oil; blue chamomile oil; Roman chamomile oil; carrot seed oil; cascarilla oil; pine needle oil; spearmint oil; caraway oil; labdanum oil; labdanum absolute; labdanum resin; lavandin absolute; lavandin oil; lavender absolute; lavender oil; lemongrass oil; lovage oil; distilled lime oil; pressed lime oil; linaloe oil; Litsea-cubeba oil; bay leaf oil; mace oil; marjoram oil; mandarin oil; massoy bark oil; mimosa absolute; musk kernel oil; musk tincture; muscatel-sage oil; nutmeg oil; myrrh absolute; myrrh oil; myrtle oil; clove leaf oil; clove blossom oil; neroli oil; olibanum absolute; olibanum oil; opopanax oil; orange blossom absolute; orange oil; origanum oil; palmarosa oil; patchouli oil;

perilla oil; Peru balsam oil; parsley leaf oil; parsley seed oil; petitgrain oil; peppermint oil; pepper oil; pimenta oil; pine oil; poley oil; rose absolute; rosewood oil; rose oil; rosemary oil; Dalmatian sage oil; Spanish sage oil; celery seed oil; spike lavender oil; star anise oil; styrax oil; tagetes oil; fir-needle oil; tea tree oil; turpentine oil; thyme oil; tolu balsam; tonka absolute; tuberose absolute; vanilla extract; violet leaf absolute; verbena oil; vetiver oil; Juniper berry oil; wine lees oil; wormwood oil; wintergreen oil; ylang-ylang oil; hyssop oil; civet absolute; cinnamon leaf oil; cinnamon bark oil.

Examples of flavoring materials to be used according to the invention are listed in sections 1 to 3 of the Decision of the Commission dated 23 Feb. 1999 concerning a list of flavoring materials used in or on foodstuffs, which was drawn up according to Directive (EC) No. 2232/96 of the European Parliament and of the Council dated 28 Oct. 1996 (1999/217/EC), which can be inspected in the Official Gazette of the European Community L 84/1 dated 27 Mar. 1999 and in the appendix of the decision of the Commission dated 18 Jul. 2000 amending Decision 1999/217/EC of the Commission concerning a list of flavoring materials used in or on foodstuffs (2000/489/EC), which can be inspected in the Official Gazette of the European Community L 197/53 dated 3 Aug. 2000.

The flavoring materials that are preferably to be used and therefore are preferably included, in the context of the present invention, can be selected from:

the group of aliphatic alcohols, for example hexanol; octanol; 3-octanol; 2,6-dimethyl-heptanol; 2-methyl-heptanol, 2-methyloctanol; (E)-2-hexenol; (E)- and (Z)-3-hexenol; 1-octen-3-ol; mixture of 3,4,5,6,6-pentamethyl-3/4-hepten-2-ol and 3,5,6,6-tetramethyl-4-methylene-heptan-2-ol; (E,Z)-2,6-nonadienol; 3,7-dimethyl-7-methoxyoctan-2-ol; 9-decenol; 10-undecenol; 4-methyl-3-decen-5-ol;

the group of aliphatic aldehydes and acetals thereof, for example hexanal; heptanal; octanal; nonanal; decanal; undecanal; dodecanal; tridecanal; 2-methyloctanal; 2-methylnonanal; (E)-2-hexenal; (Z)-4-heptenal; 2,6-dimethyl-5-heptenal; 10-undecenal; (E)-4-decenal; 2-dodecenal; 2,6,10-trimethyl-5,9-undecadienal; heptanaldiethylacetal; 1,1-dimethoxy-2,2,5-trimethyl-4-hexene;

the group of aliphatic ketones and oximes thereof, for example 2-heptanone; 2-octanone; 3-octanone; 2-nonanone; 5-methyl-3-heptanone; 5-methyl-3-heptanone-oxime; 2,4,4,7-tetramethyl-6-octen-3-one; the aliphatic sulphur-containing compounds, for example 3-methylthiohexanol; 3-methylthiohexyl acetate; 3-mercaptohexanol; 3-mercaptohexyl acetate; 3-mercaptohexyl butyrate; 3-acetylthiohexyl acetate; 1-menthene-8-thiol;

the group of aliphatic nitriles, for example 2-nonenoic acid nitrile; 2-tridecenoic acid nitrile; 2,12-tridecadienoic acid nitrile; 3,7-dimethyl-2,6-octadienoic acid nitrile; 3,7-dimethyl-6-octenoic acid nitrile;

the group of aliphatic carboxylic acid esters, for example (E)- and (Z)-3-hexenylformate; ethyl acetoacetate; isoamyl acetate; hexyl acetate; 3,5,5-trimethylhexyl acetate; 3-methyl-2-butenyl acetate; (E)-2-hexenyl acetate; (E)- and (Z)-3-hexenyl acetate; octyl acetate; 3-octyl acetate; 1-octen-3-yl acetate; ethyl butyrate; butyl butyrate; isoamyl butyrate; hexyl butyrate; (E)- and (Z)-3-hexenylisobutyrate; hexyl crotonate; ethyl isovalerate; ethyl-2-methylpentanoate; ethyl hexanoate; allyl hexanoate; ethyl heptanoate; allyl heptanoate; ethyl octanoate; ethyl-(E,Z)-2,4-decadienoate; methyl-2-octinate; methyl-2-noninate; allyl-2-isoamyloxyacetate; methyl-3,7-dimethyl-2,6-octadienoate;

the group of acyclic terpene alcohols, for example citronellol; geraniol; nerol; linalool; lavadulol; nerolidol; farnesol; tetrahydrolinalool; tetrahydrogeraniol; 2,6-dimethyl-7-octen-2-ol; 2,6-dimethyloctan-2-ol; 2-methyl-6-methylene-7-octen-2-ol; 2,6-dimethyl-5,7-octadien-2-ol; 2,6-dimethyl-3,5-octadien-2-ol; 3,7-dimethyl-4,6-octadien-3-ol; 3,7-dimethyl-1,5,7-octatrien-3-ol 2,6-dimethyl-2,5,7-octatrien-1-ol; and formates, acetates, propionates, isobutyrates, butyrates, isovalerates, pentanoates, hexanoates, crotonates, tiglinates, 3-methyl-2-butenoates thereof;

the group of acyclic terpene aldehydes and ketones, for example geranial; neral; citronellal; 7-hydroxy-3,7-dimethyloctanal; 7-methoxy-3,7-dimethyloctanal; 2,6,10-trimethyl-9-undecenal; geranyl acetone; and the dimethyl- and diethylacetals of geranial, neral, 7-hydroxy-3,7-dimethyloctanal;

the group of cyclic terpene alcohols, for example menthol; isopulegol; alpha-terpineol; terpinenol-4; menthan-8-ol; menthan-1-ol; menthan-7-ol; borneol; isoborneol; linalool oxide; nopol; cedrol; ambrinol; vetiverol; guaiol; and formates, acetates, propionates, isobutyrates, butyrates, isovalerates, pentanoates, hexanoates, crotonates, tiglinates, 3-methyl-2-butenoates thereof;

the group of cyclic terpene aldehydes and ketones, for example menthone; isomenthone; 8-mercaptomenthan-3-one; carvone; camphor; fenchone; alpha-ionone; beta-ionone; alpha-n-methylionone; beta-n-methylionone; alpha-isomethylionone; beta-isomethylionone; alpha-irone; alpha-damascone; beta-damascone; beta-damascenone; delta-damascone; gamma-damascone; 1-(2,4,4-trimethyl-2-cyclohexen-1-yl)-2-buten-1-one; 1,3,4,6,7,8a-hexahydro-1,1,5,5-tetramethyl-2H-2,4a-methanonaphthalen-8(5H)-one; nootkatone; dihydronootkatone; alpha-sinensal; beta-sinensal;

the group of cyclic alcohols, for example 4-tert.-butylcyclohexanol; 3,3,5-trimethyl cyclo-hexanol; 3-isocamphylcyclohexanol; 2,6,9-trimethyl-Z2,Z5,E9-cyclododecatrien-1-ol; 2-isobutyl-4-methyltetrahydro-2H-pyran-4-ol;

the group of cycloaliphatic alcohols, for example alpha-3,3-trimethyl cyclohexylmethanol; 2-methyl-4-(2,2,3-trimethyl-3-cyclopent-1-yl)butanol; 2-methyl-4-(2,2,3-trimethyl-3-cyclopent-1-yl)-2-buten-1-ol; 2-ethyl-4-(2,2,3-trimethyl-3-cyclopent-1-yl)-2-buten-1-ol; 3-methyl-5-(2,2,3-trimethyl-3-cyclopent-1-yl)-pentan-2-ol; 3-methyl-5-(2,2,3-trimethyl-3-cyclopent-1-yl)-4-penten-2-ol; 3,3-dimethyl-5-(2,2,3-trimethyl-3-cyclopent-1-yl)-4-penten-2-ol; 1-(2,2,6-trimethyl cyclohexyl)pentan-3-ol; 1-(2,2,6-trimethyl cyclohexyl)hexan-3-ol;

the group of esters of cycloaliphatic carboxylic acids, for example allyl-3-cyclohexylpropionate; allylcyclohexyloxyacetate; methyldihydrojasmonate; methyljasmonate; methyl-2-hexyl-3-oxocyclopentane carboxylate; ethyl-2-ethyl-6,6-dimethyl-2-cyclohexene carboxylate; ethyl-2,3,6,6-tetramethyl-2-cyclohexene carboxylate; ethyl-2-methyl-1,3-dioxolane-2-acetate;

the group of aromatic hydrocarbons, for example styrene and diphenylmethane;

the group of araliphatic alcohols, for example benzyl alcohol; 1-phenylethyl alcohol; 2-phenylethyl alcohol; 3-phenylpropanol; 2-phenylpropanol; 2-phenoxyethanol; 2,2-dimethyl-3-phenylpropanol; 2,2-dimethyl-3-(3-methylphenyl)propanol; 1,1-dimethyl-2-phenylethyl alcohol; 1,1-dimethyl-3-phenylpropanol; 1-ethyl-1-methyl-3-phenylpropanol; 2-methyl-5-phenylpentanol; 3-methyl-5-phenylpentanol; 3-phenyl-2-propen-1-ol; 4-methoxybenzyl alcohol; 1-(4-isopropylphenyl)ethanol;

the group of esters of araliphatic alcohols and aliphatic carboxylic acids, for example benzyl acetate; benzyl propionate; benzyl isobutyrate; benzyl isovalerate; 2-phenylethyl acetate; 2-phenylethylpropionate; 2-phenylethylisobutyrate; 2-phenylethylisovalerate; 1-phenylethyl acetate; alpha-trichloromethylbenzyl acetate; alpha,alpha-dimethylphenylethyl acetate; alpha,alpha-dimethylphenylethyl butyrate; cinnamyl acetate; 2-phenoxyethylisobutyrate; 4-methoxybenzyl acetate; the araliphatic ethers, for example 2-phenylethylmethyl ether; 2-phenylethylisoamyl ether; 2-phenylethyl-1-ethoxyethyl ether; phenylacetaldehyde-dimethylacetal; phenylacetaldehyde-diethylacetal; hydratropa-aldehyde-dimethylacetal; phenylacetaldehyde-glycerinacetal;

the group of aromatic and araliphatic aldehydes, for example benzaldehyde; phenylacetaldehyde; 3-phenylpropanal; hydratropa-aldehyde; 4-methylbenzaldehyde; 4-methylphenylacetaldehyde; 3-(4-ethylphenyl)-2,2-dimethylpropanal; 2-methyl-3-(4-isopropylphenyl)propanal; 2-methyl-3-(4-tert.-butylphenyl)propanal; 3-(4-tert.-butyl-phenyl)propanal; cinnamaldehyde; alpha-butyl cinnamaldehyde; alpha-amyl cinnamaldehyde; alpha-hexyl cinnamaldehyde; 3-methyl-5-phenylpentanal; 4-methoxybenzaldehyde; 4-hydroxy-3-methoxybenzaldehyde; 4-hydroxy-3-ethoxybenzaldehyde; 3,4-methylene dioxybenzaldehyde; 3,4-dimethoxybenzaldehyde; 2-methyl-3-(4-methoxyphenyl)propanal; 2-methyl-3-(4-methylene dioxyphenyl)propanal;

the group of aromatic and araliphatic ketones, for example acetophenone; 4-methylacetophenone; 4-methoxyacetophenone; 4-tert.-butyl-2,6-dimethylacetophenone; 4-phenyl-2-butanone; 4-(4-hydroxyphenyl)-2-butanone; 1-(2-naphthalenyl)ethanone; benzophenone;

the group of aromatic and araliphatic carboxylic acids and esters thereof, for example benzoic acid; phenylacetic acid; methyl benzoate; ethyl benzoate; hexyl benzoate; benzyl benzoate; methylphenyl acetate; ethylphenyl acetate; geranylphenyl acetate; phenylethyl-phenyl acetate; methyl cinnamate; ethyl cinnamate; benzyl cinnamate; phenylethyl cinnamate; cinnamyl cinnamate; allylphenoxyacetate; methyl salicylate; isoamyl salicylate; hexyl salicylate; cyclohexyl salicylate; cis-3-hexenyl salicylate; benzyl salicylate; phenylethyl salicylate; methyl-2,4-dihydroxy-3,6-dimethyl benzoate; ethyl-3-phenylglycidate; ethyl-3-methyl-3-phenylglycidate;

the group of nitrogen-containing aromatic compounds, for example 2,4,6-trinitro-1,3-dimethyl-5-tert.-butylbenzene; 3,5-dinitro-2,6-dimethyl-4-tert.-butylacetophenone; cinnamic acid nitrile; 5-phenyl-3-methyl-2-pentenoic acid nitrile; 5-phenyl-3-methylpentanoic acid nitrile; methylanthranilate; methyl-N-methylanthranilate; Schiff's bases of methylanthranilate with 7-hydroxy-3,7-dimethyloctanal, 2-methyl-3-(4-tert.-butylphenyl)propanal or 2,4-dimethyl-3-cyclohexene-carbaldehyde; 6-isopropylquinoline; 6-isobutylquinoline; 6-sec.-butylquinoline; indole; skatole; 2-methoxy-3-isopropylpyrazine; 2-isobutyl-3-methoxypyrazine;

the group of phenols, phenyl ethers and phenyl esters, for example estragol; anethol; eugenol; eugenylmethyl ether; isoeugenol; isoeugenylmethyl ether; thymol; carvacrol; diphenyl ether; beta-naphthylmethyl ether; beta-naphthylethyl ether; beta-naphthylisobutyl ether; 1,4-dimethoxybenzene; eugenyl acetate; 2-methoxy-4-methylphenol; 2-ethoxy-5-(1-propenyl)phenol; p-cresylphenyl acetate;

the group of heterocyclic compounds, for example 2,5-dimethyl-4-hydroxy-2H-furan-3-one; 2-ethyl-4-hydroxy-5-methyl-2H-furan-3-one; 3-hydroxy-2-methyl-4H-pyran-4-one; 2-ethyl-3-hydroxy-4H-pyran-4-one;

the group of lactones, for example 1,4-octanolide; 3-methyl-1,4-octanolide; 1,4-nonanolide; 1,4-decanolide; 8-decen-1,4-olide; 1,4-undecanolide; 1,4-dodecanolide; 1,5-decanolide; 1,5-dodecanolide; 1,15-pentadecanolide; cis- and trans-11-pentadecen-1,15-olide; cis- and trans-12-pentadecen-1,15-olide; 1,16-hexadecanolide; 9-hexadecen-1,16-olide; 10-oxa-1,16-hexadecanolide; 11-oxa-1,16-hexadecanolide; 12-oxa-1,16-hexadecanolide; ethylene-1,12-dodecanedioate; ethylene-1,13-tridecanedioate; coumarin; 2,3-dihydrocoumarin; octahydrocoumarin.

Particularly preferably, flavoring materials are selected from acetophenone, allyl caproate, alpha-ionone, beta-ionone, anisaldehyde, anisyl acetate, anisyl formate, benzaldehyde, benzothiazole, benzyl acetate, benzyl alcohol, benzyl benzoate, beta-ionone, butyl butyrate, butyl caproate, butylidene-phthalide, carvone, camphene, caryophyllene, cineol, cinnamyl acetate, citral, citronellol, citronellal, citronellyl acetate, cyclohexyl acetate, cymene, damascone, decalactone, dihydrocoumarin, dimethylanthranilate, dimethylanthranilate, dodecalactone, ethoxyethyl acetate, ethylbutyric acid, ethyl butyrate, ethyl caprinate, ethyl caproate, ethyl crotonate, ethylfuraneol, ethylguaiacol, ethylisobutyrate, ethylisovalerate, ethyllactate, ethylmethyl butyrate, ethylpropionate, eucalyptol, eugenol, ethylheptylate, 4-(p-hydroxyphenyl)-2-butanone, gamma-decalactone, geraniol, geranyl acetate, geranyl acetate, grapefruit aldehyde, methyldihydrojasmonate (e.g. Hedion®), heliotropin, 2-heptanone, 3-heptanone, 4-heptanone, trans-2-heptenal, cis-4-heptenal, trans-2-hexenal, cis-3-hexenol, trans-2-hexenoic acid, trans-3-hexenoic acid, cis-2-hexenyl acetate, cis-3-hexenyl acetate, cis-3-hexenyl caproate, trans-2-hexenyl caproate, cis-3-hexenylformate, cis-2-hexyl acetate, cis-3-hexyl acetate, trans-2-hexyl acetate, cis-3-hexylformate, para-hydroxybenzyl acetone, isoamyl alcohol, isoamylisovalerate, isobutyl butyrate, isobutyraldehyde, isoeugenolmethyl ether, isopropylmethylthiazole, lauric acid, levulinic acid, linalool, linalool oxide, linalyl acetate, menthol, menthofuran, methylanthranilate, methylbutanol, methylbutyric acid, 2-methylbutyl acetate, methyl caproate, methyl cinnamate, 5-methylfurfural, 3,2,2-methyl cyclopentenolone, 6,5,2-methylheptenone, methyldihydrojasmonate, methyljasmonate, 2-methylmethyl butyrate, 2-methyl-2-pentenolic acid, methylthiobutyrate, 3,1-methylthiohexanol, 3-methylthiohexyl acetate, nerol, neryl acetate, trans,trans-2,4-nonadienal, 2,4-nonadienol, 2,6-nonadienol, 2,4-nonadienol, nootkatone, delta octalactone, gamma octalactone, 2-octanol, 3-octanol, 1,3-octenol, 1-octyl acetate, 3-octyl acetate, palmitic acid, paraldehyde, phellandrene, pentanedione, phenylethyl acetate, phenylethyl alcohol, phenylethyl alcohol, phenylethylisovalerate, piperonal, propionaldehyde, propyl butyrate, pulegon, pulegol, sinensal, sulphurol, terpinene, terpineol, terpinolene, 8,3-thiomenthanone, 4,4,2-thiomethylpentanone, thymol, delta-undecalactone, gamma-undecalactone, valencene, valeric acid, vanillin, acetoin, ethylvanillin, ethylvanillinisobutyrate (=3-ethoxy-4-isobutyryloxybenzaldehyde), 2,5-dimethyl-4-hydroxy-3(2H)-furanone and derivatives thereof (and preferably homofuraneol (=2-ethyl-4-hydroxy-5-methyl-3(2H)-furanone), homofuronol (=2-ethyl-5-methyl-4-hydroxy-3(2H)-furanone and 5-ethyl-2-methyl-4-hydroxy-3(2H)-furanone), maltol and maltol derivatives (and preferably ethylmaltol), coumarin and coumarin derivatives, gamma-lactones (and preferably gamma-undecalactone, gamma-nonalactone, gamma-decalactone), delta-lactones (and preferably 4-methyldeltadecalactone, massoy-lactone, deltadecalactone, tuberolactone), methylsorbate, divanillin, 4-hydroxy-2(or 5)-ethyl-5(or 2)-methyl-3(2H)furanone, 2-hydroxy-3-methyl-2-cyclopentenone, 3-hydroxy-4,5-dimethyl-2(5H)-furanone, acetic acid isoamyl ester, butyric acid ethyl ester, butyric acid-n-butyl ester, butyric acid isoamyl ester, 3-methyl-butyric acid ethyl ester, n-hexanoic acid ethyl ester, n-hexanoic acid allyl ester, n-hexanoic acid-n-butyl ester, n-octanoic acid ethyl ester, ethyl-3-methyl-3-phenylglycidate, ethyl-2-trans-4-cis-decadienoate, 4-(p-hydroxyphenyl)-2-butanone, 1,1-dimethoxy-2,2,5-trimethyl-4-hexane, 2,6-dimethyl-5-hepten-1-al and phenylacetaldehyde, 2-methyl-3-(methylthio)furan, 2-methyl-3-furanthiol, bis(2-methyl-3-furyl)disulphide, furfuryl mercaptan, methional, 2-acetyl-2-thiazoline, 3-mercapto-2-pentanone, 2,5-dimethyl-3-furanthiol, 2,4,5-trimethylthiazole, 2-acetylthiazole, 2,4-dimethyl-5-ethylthiazole, 2-acetyl-1-pyrroline, 2-methyl-3-ethylpyrazine, 2-ethyl-3,5-dimethylpyrazine, 2-ethyl-3,6-dimethylpyrazine, 2,3-diethyl-5-methylpyrazine, 3-isopropyl-2-methoxypyrazine, 3-isobutyl-2-methoxypyrazine, 2-acetylpyrazine, 2-pentylpyridine, (E,E)-2,4-decadienal, (E,E)-2,4-nonadienal, (E)-2-octenal, (E)-2-nonenal, 2-undecenal, 12-methyltridecanal, 1-penten-3-one, 4-hydroxy-2,5-dimethyl-3(2H)-furanone, guaiacol, 3-hydroxy-4,5-dimethyl-2(5H)-furanone, 3-hydroxy-4-methyl-5-ethyl-2(5H)-furanone, cinnamaldehyde, cinnamyl alcohol, methyl salicylate, isopulegol and (not explicitly stated here) stereoisomers, enantiomers, positional isomers, diastereomers, cis/trans-isomers or epimers of these substances.

A method for preparing inclusion products according to the invention is particularly suitable for including temperature-sensitive flavoring materials. These are preferably selected from the flavoring materials mentioned in the preceding paragraph, and mixtures of two or a plurality of these flavoring materials.

An inclusion product is preferred according to the invention for which, in step (iv), a flavoring material is added at a temperature of the solution of max. 30° C., preferably at 1 through 30° C., more preferably at 5 through 20° C. and particularly preferably at 5 through 15° C. It is a particular advantage of the method according to the invention for preparing inclusion products and of the retrograding and/or retrograded maltodextrin fraction according to the invention, that at the stated temperatures there is no immediate and abrupt retrogradation of the maltodextrin fraction, instead there is sufficient time for adding one or a plurality of flavoring materials to form an inclusion product. Therefore the flavoring material or materials that are to be included can be processed at advantageously low temperatures for preparing an inclusion product, so that its/their thermal stress remains small and disintegration of the flavoring material and/or formation of undesirable off-flavors can be restricted or completely prevented. It is also advantageous that despite the possible gentle treatment, a high yield of included flavoring material is still always achieved in the finished inclusion product.

Moreover, a method of preparation is preferred in which, after step (iii), one or a plurality of further carriers are added, so that the ratio of carrier(s) to the maltodextrin fraction (dry weight) is 0.05:1 through 3:1, preferably 0.15:1 through 2:1, more preferably 0.15:1 through 1:1, particularly preferably 0.15:1 through 0.7:1. By adding one or a plurality of further carriers, advantageously the proportion of inclusion product-bound flavoring material can be further increased and the losses of non-included and non-dispersed flavoring materials are decreased. Moreover, the further carrier or carriers can increase the storage stability of the inclusion product, in particular by lowering the oxidation sensitivity of the flavoring materials.

The further carrier or carriers are preferably selected from the list consisting of gum arabic, starch octenyl succinate, alginates, modified celluloses, e.g. carboxymethyl cellulose, methyl cellulose, ethyl cellulose, agar, carrageenan, carob seed flour, guar, xanthan, tragacanth, gellan, pectins, modified starches, e.g. oxidized starch, phosphate starches, acetylated starch, starch adipates and hydroxypropyl starches. Gum arabic and starch octenyl succinate are preferred. An inclusion product according to the invention therefore preferably contains one or a plurality of carriers, wherein the content of carriers is 5-40 wt. %, preferably 10-35 wt. %, particularly preferably 20-35 wt. %, in each case relative to the total content of maltodextrin fraction (dry content), included and dispersed flavoring materials and carriers.

Furthermore, according to the invention, a preparation or semi-finished product to be used for nutrition or for pleasure is provided, comprising an amount of inclusion product according to the invention (preferably an inclusion product according to the invention indicated above as preferred). Said preparation or semi-finished product according to the invention can easily be prepared as described above. Moreover, the flavoring material present in the inclusion product according to the invention is, as described above, protected in particular against storage and oxidation losses and has a high flavor impact.

In a preparation or semi-finished product according to the invention that is to be used for nutrition or for pleasure, the total proportion of the inclusion product relative to the total weight of the preparation or semi-finished product is 0.001 through 10 wt. %, preferably 0.01 through 5 wt. % and particularly preferably 0.1 through 3 wt. %.

The invention is described in more detail below, with examples, but these do not limit the scope of protection of the claims. Unless stated otherwise, all percentages are percentages by weight.

Example 1

Obtaining a Retrograding Maltodextrin Fraction

In an Erlenmeyer flask, 250 g maltodextrin from potato starch with DE-10 is steeped in 250 g of boiling water and dissolved using a magnetic stirrer. The flask is sealed and kept at 90° C. for 30 minutes. This is for destroying dangerous microorganisms in accordance with food processing law. The maltodextrin fractions capable of retrogradation are precipitated in a refrigerator at 7° C. for a period of 48 h. The batch is diluted with 250 ml of cold water (15° C.). The retrograded maltodextrin fraction is separated by means of a pleated filter and washed with a further 250 ml of cold water (15° C.). The resultant retrograded/retrograding maltodextrin fraction is dried overnight at 60° C. in a circulating-air drying cabinet. The yield is 109.7 g or 43.9% of the starting mass.

Example 2

Preparing an Inclusion Product According to the Invention

The retrograding maltodextrin fraction from example 1 is steeped in hot water at 90° C. and is dissolved using a magnetic stirrer. When the solution has cooled to 50° C., geraniol is added as flavoring material to be included, the vessel with the dissolved maltodextrin fraction and geraniol is covered with aluminum foil and is cooled to room temperature (20° C.) within 3 hours with stirring, and is stirred for a further 13 hours. The resultant mixture is poured onto a tray and is dried in a circulating-air drying cabinet at 30° C. for 12 h. A solid is obtained with an included geraniol content of 3.5 wt. % and a total geraniol content of 9.9 wt. %, which gives a content of dispersed geraniol of 6.4 wt. %.

Example 3

Inclusion Product Without Retrograding Maltodextrin Fraction According to the Invention Example 2 is repeated, but using, instead of the retrograding maltodextrin fraction according to the invention, the untreated maltodextrin with a DE value of 10 from example 1. The product obtained has a total geraniol content of 9.5 wt. % and a content of included geraniol of 0.05 wt. %. This gives a total content of dispersed geraniol of 9.45 wt. %.

Example 4

Comparative Example

Example 1 is repeated, using a maltodextrin from potato starch with DE 2, instead of the maltodextrin from potato starch with DE 10.

From the maltodextrin with DE 2, 121.3 g of a retrograded fraction can be precipitated, which corresponds to a mass yield of 48.5%. This is admittedly slightly higher than for the maltodextrin with DE 10, but the fraction obtained from the maltodextrin with DE 2 does not have the advantageous properties according to the invention. In particular this fraction is almost insoluble in water at 100° C. at ambient pressure and at a pH value of 7 (the solubility is only 9.3 wt. %).

If the maltodextrin fraction from DE 2 in example 2 is used instead of the maltodextrin fraction according to the invention from DE 10 that is used there, the resultant product only has an included geraniol content of 0.3 wt. % and a total geraniol content of 9.9 wt. %, which gives a content of dispersed geraniol of 9.6 wt. %.

Example 5

Comparative Example

Example 1 is repeated, using a maltodextrin from potato starch with DE 20 instead of the maltodextrin from potato starch with DE 10.

Only 351 mg of retrograding fraction is obtained. The maltodextrin with DE 20 is not suitable for obtaining a retrograding fraction, as the mass yield is only 0.1%.

Examples 6 and 7

Comparative Examples

These examples clarify the inclusion behavior of maltodextrins that were not fractionated beforehand according to the invention. Preparation was carried out as described in example 2.

| Ex. | | Total geraniol content [wt. %] | Included geraniol content [wt. %] | Dispersed geraniol content [wt. %] | Viscosity * mPas |
|---|---|---|---|---|---|
| 7 | Maltodextrin DE2 (comparative example) | 9.8 | 2.3 | 7.5 | 2251 |
| 8 | Maltodextrin DE20 (comparative example) | 9.8 | 0.0 | 9.8 | 85 |
| 2 | Fraction from maltodextrin DE 10 (according to the invention) | 9.9 | 3.5 | 6.4 | 97 |

* Viscosity of the dispersion after precipitation of the geraniol inclusion compounds Of the maltodextrins given for comparison, only the maltodextrin with DE 2 (without previous fractionation) is capable of forming inclusion compounds with geraniol to a notable extent. However, in parallel with formation of the inclusion compounds, there is an enormous increase in viscosity of the dispersion. As a result, the subsequent steps of further processing are more difficult and in particular, spray-drying cannot be carried out economically.

The dispersion according to the invention has, in contrast, a very low viscosity up until drying, so that spray-drying can take place in the subsequent production steps.

Example 8

Inclusion Product According to the Invention with Further Carrier

The retrograding maltodextrin fraction from example 1 (280 g) is steeped in 925 g of hot water (70° C.) and is dissolved. The solution is cooled to 35° C. and an onion flavor (100 g) is added. Still stirring, the mixture is cooled to 20° C. and is stirred for a further 3 hours. Then gum arabic (120 g) is added and dissolved. By means of a Niro Minor spray tower, the batch is dried at 180° C. air inlet temperature and 80° C. air outlet temperature.

The total content of flavoring material is 19.8 wt. %, of which 1.8 wt. % is included and 18.0 wt. % is dispersed.

For purposes of comparison, the tests are repeated, using, instead of the maltodextrin fraction, a maltodextrin with DE 10 (total content of flavoring material of the product 19.8 wt. %, of which 0.1 wt. % is included and 19.7% is dispersed), or in another test, yeast cell walls are used (total content of flavoring material of the product 19.8 wt. %, of which 0.0 wt. % is included and 19.8% is dispersed).

| | |
|---|---|
| Wheat flour | 61.50% |
| Baking powder | 1.25% |
| Vegetable fat | 6.25% |
| Maltose syrup | 2.25% |
| Emulsifier lecithin | 1.40% |
| Ammonium bicarbonate | 1.75% |
| Spray-dried skim milk powder | 1.25% |
| Fresh baker's yeast | 0.60% |
| Table salt | 0.40% |
| Water | 23.34% |
| Inclusion product according to the invention or comparative products | 0.01% |
| Total | 100.00% |

After mixing the ingredients, the crackers are baked at 200° C. The crackers are tasted and the intensity of the onion taste

| Inclusion product according to the invention | 7 |
|---|---|
| Comparative product with maltodextrin DE 10 | 3 |
| Comparative product with yeast cell walls | 4 |

The invention claimed is:

1. A retrograded isolated maltodextrin fraction, wherein
a) the isolated maltodextrin fraction is water-soluble to more than 95 wt. % at a temperature of 50-100° C. and 1013 hPa and a pH of 7, or
b) a dispersion of 25 wt % of the isolated maltodextrin fraction in 75 wt. % water at pH 7, after retrogradation and storage at rest for 24 h at 5° C., has a viscosity of 10-500 mPas, wherein the viscosity is measured at 25° C., 1013 hPa with a plate-on-plate viscosimeter and a shear rate of $1000\ s^{-1}$.

2. The retrograded maltodextrin fraction as claimed in claim 1, wherein the maltodextrin fraction comprises a maximum content of non-retrograded maltodextrin of 30 wt. %, relative to the total maltodextrin fraction.

3. The retrograded maltodextrin fraction as claimed in claim 1 being the dispersion b), the 25 wt. % mixture of the maltodextrin fraction in water at pH 7, 100° C. and 1013 hPa, at equilibrium, comprising at least 95 wt. % dissolved maltodextrin fraction.

4. A retrograded maltodextrin fraction, obtained by a process comprising:
(i) providing a maltodextrin fraction with a DE value of 7-14;
(ii) preparing a 15-70 wt. % solution of the maltodextrin fraction in water at a temperature of 10-100° C. and a pH of 5-9;
(iii) retrograding the maltodextrin fraction solution at a temperature from −5 through 30° C. for a period of 1-48 hours; and
(iv) separating the retrograded maltodextrin fraction.

5. The retrograded maltodextrin fraction as claimed in claim 4, wherein the water content of the retrograded maltodextrin fraction is from 5 through 10 wt. %, relative to the total maltodextrin fraction.

6. The retrograded maltodextrin fraction as claimed in claim 4, wherein the maltodextrin fraction is spray-dried or drum dried after step (iv).

7. The retrograded maltodextrin fraction as claimed in claim 4, wherein at least 95 wt. % of the maltodextrin fraction is water-soluble at pH 7, 100° C. and 1013 hPa, wherein the wt. % is relative to the total maltodextrin fraction, and wherein the water-solubility is determined by a method comprising:
(i) preparing a dispersion of 12.5 g of the dry maltodextrin fraction in 37.5 g of water at a pH of 7;
(ii) heating the dispersion to 100° C. at 1013 hPa to dissolve the maltodextrin fraction;
(iii) cooling the heated dispersion to 50° C.;
(iv) centrifuging the cooled dispersion at 12000 g for 15 min;
(v) decanting the supernatant;
(vi) slurrying the sediment with 37.5 g of water at a temperature of 5° C. centrifuging the slurry at 12000 g for 15 min, and then decanting the supernatant;
(vii) repeating step (vi);
(viii) drying the sediment obtained in step (vii) and weighing the dried sediment.

8. A solution of maltodextrin fraction comprising a water content of 50-95 wt. %, relative to the total content of dry maltodextrin fraction and water, wherein the maltodextrin fraction is a maltodextrin fraction as claimed in claim 1.

9. The solution of maltodextrin fraction as claimed in claim 8, wherein the solution is at a temperature of 50-100° C. and a pressure of 800-1080 hPa, relative to a pressure of 1013 hPa.

10. The solution of maltodextrin fraction as claimed in claim 8, wherein the maltodextrin fraction is dissolved to at least 70 wt. %, relative to the total maltodextrin fraction.

11. An inclusion product comprising one or more flavoring materials and a maltodextrin fraction as claimed in claim 1, wherein the product comprises:
60-99.8 wt % of maltodextrin fraction;
0.1-10 wt. % of one or more included flavoring materials; and
0.1-30 wt. % of one or more dispersed flavoring materials, wherein the wt. %, in each case, is relative to the total content of the dry maltodextrin fraction, included flavoring materials and dispersed flavoring materials.

12. The inclusion product as claimed in claim 11, further comprising 5-40 wt. % of one or more carriers selected from the group consisting of gum arabic, starch octenyl succinate, alginates, modified celluloses, agar, carrageenan, carob seed flour, guar, xanthan, tragacanth, gellan, pectins, and modified starches, wherein the wt. % of the one or more carriers, in each case, is relative to the total content of maltodextrin fraction, included flavoring materials, dispersed flavoring materials, and carriers.

13. An inclusion product, obtained by a process comprising:
(i) paring a mixture of a maltodextrin fraction as claimed in claim 1 in water at a pH of 5-9, wherein the dry content of maltodextrin fraction in the mixture is 5-50 wt. %;
(ii) heating the mixture prepared in step (i) to 50-100° C. at max. 1080 hPa, so that at least 70 wt. % of the maltodextrin fraction is dissolved;
(iii) cooling the solution obtained in step (ii) to a maximum temperature of 1-30° C. to prepare a dispersion of retrograded maltodextrin; and
(iv) adding one or more flavoring materials to be included to the solution before or during step (iii).

14. The inclusion product as claimed in claim 13, wherein step (iv) is carried out such that the ratio of total added flavoring materials to dry maltodextrin fraction is 0.01:1 through 2:1, or
a flavoring material is added to the solution in step (iv), wherein the solution has a maximum temperature of 30° C., or
after step (iii), one or more further carriers selected from the group consisting of gum arabic, starch octenyl succinate, alginates, modified celluloses, agar, carrageenan, carob seed flour guar, xanthan, tragacanth, gellan, pectins, and modified starches are added to the inclusion product, so that the ratio of carriers to the dry weight of the maltodextrin fraction is 0.05:1 through 3:1.

15. The inclusion product as claimed in claim 11, wherein the one or more flavoring materials are selected from the group consisting of acetophenone, allyl caproate, alpha-ionone, beta-ionone, anisaldehyde, anisyl acetate, anisyl formate, benzaldehyde, benzothiazole, benzyl acetate, benzyl alcohol, benzyl benzoate, beta-ionone, butyl butyrate, butyl caproate, butylidenephthalide, carvone, camphene, caryophyllene, cineol, cinnamyl acetate, citral, citronellol, citronellal, citronellyl acetate, cyclohexyl acetate, cymene, damascone, decalactone, dihydrocoumarin, dimethylanthranilate, dimethylanthranilate, dodecalactone, ethoxyethyl acetate, ethylbutyric acid, ethyl butyrate, ethyl caprinate, ethyl capronate, ethyl crotonate, ethylfuraneol, ethylguaiacol, ethylisobutyrate, ethylisovalerate, ethyllactate, ethylmethyl butyrate, ethylpropionate, eucalyptol, eugenol, ethylheptylate, 4-(p-hydroxyphenyl)-2-butanone, gamma-decalactone, geraniol, geranyl acetate, grapefruit aldehyde, methyldihydrojasmonate, heliotropin, 2-heptanone, 3-heptanone, 4-heptanone, trans-2-heptenal, cis-4-heptenal, trans-2-hexenal, cis-3-hexenol, trans-2-hexenoic acid, trans-3-hexenoic acid, cis-2-hexenyl acetate, cis-3-hexenyl acetate, cis-3-hexenyl caproate, trans-2-hexenyl caproate, cis-3-hexenyl formate, cis-2-hexyl acetate, cis-3-hexyl acetate, trans-2-hexyl acetate, cis-3-hexyl formate, para-hydroxybenzyl acetone, acetone, isoamyl alcohol, isoamylisovalerate, isobutyl butyrate, isobutyraldehyde, isoeugenolmethyl ether, isopropylmethylthiazole, lauric acid, levulinic acid, linalool, linalool oxide, linalyl acetate, menthol, menthofuran, methylanthranilate, methylbutanol, methylbutyric acid, 2-methylbutyl acetate, methyl caproate, methyl cinnamate, 5-methylfurfural, 3,2,2-methyl cyclopentenolone, 6,5,2-methylheptenone, methyldihydrojasmonate, methyljasmonate, 2-methylmethyl butyrate, 2-methyl-2-pentenolic acid, methylthiobutyrate, 3,1-methylthiohexanol, 3-methylthiohexyl acetate, nerol, neryl acetate, trans,trans-2,4-nonadienal, 2,4-nonadienol, 2,6-nonadienol, 2,4-nonadienol, nootkatone, delta octalactone, gamma octalactone, 2-octanol, 3-octanol, 1,3-octenol, 1-octyl acetate, 3-octyl acetate, palmitic acid, paraldehyde, phellandrene, pentanedione, phenylethyl acetate, phenylethyl alcohol, phenylethyl alcohol, phenylethylisovalerate, piperonal, propionaldehyde, propyl butyrate, pulegon, pulegol, sinensal, sulphurol, terpinene, terpineol, terpinolene, 8,3-thiomenthanone, 4,4,2-thiomethylpentanone, thymol, delta-undecalactone, gamma-undecalactone, valencene, valeric acid, vanillin, acetoin, ethylvanillin, ethylvanillinisobutyrate, 2,5-dimethyl-4-hydroxy-3(2H)-furanone and derivatives thereof, homofuronol, maltol and maltol derivatives, coumarin and coumarin derivatives, gamma-lactones, delta-lactones, methyl sorbate, divanillin, 4-hydroxy-2(or 5)-ethyl-5(or 2)-methyl-3(2H)furanone 2-hydroxy-3-methyl-2-cyclopentenone, 3-hydroxy-4,5-dimethyl-2(5H)-furanone, acetic acid isoamyl ester, butyric acid ethyl ester, butyric acid n-butyl ester, butyric acid isoamyl ester, 3-methyl-butyric acid ethyl ester, n-hexanoic acid ethyl ester, n-hexanoic acid allyl ester, n-hexanoic acid-n-butyl ester, n-octanoic acid ethyl ester, ethyl-3-methyl-3-phenylglycidate, ethyl-2-trans-4-cis-decadienoate, 4-(p-hydroxyphenyl)-2-butanone, 1,1-dimethoxy-2,2,5-trimethy 1-4-hexane, 2,6-dimethyl-5-hepten-1-al and phenylacetaldehyde, 2-methyl-3-(methylthio)furan, 2-methyl-3-furanthiol, bis(2-methyl-3-furyl)disulphide, furfurylmercaptan, methional, 2-acetyl-2-thiazoline, 3-mercapto-2-pentanone, 2,5-dimethyl-3-furanthiol, 2,4,5-trimethylthiazole, 2-acetylthiazole, 2,4-dimethyl-5-ethylthiazole, 2-acetyl-1-pyrroline, 2-methyl-3-ethylpyrazine, 2-ethyl-3,5-dimethylpyrazine, 2-ethyl-3,6-dimethylpyrazine, 2,3-diethyl-5-methylpyrazine, 3-isopropyl-2-methoxypyrazine, 3-isobutyl-2-methoxypyrazine, 2-acetylpyrazine, 2-pentylpyridine, (E,E)-2,4-decadienal, (E,E)-2,4-nonadienal, (E)-2-octenal, (E)-2-nonenal, 2-undecenal, 12-methyltridecanal, 1-penten-3-one, 4-hydroxy-2,5-dimethyl-3(2H)-furanone, guaiacol, 3-hydroxy-4,5-dimethyl-2(5H)-furanone, 3-hydroxy-4-methyl-5-ethyl-2(5H)-furanone cinnamaldehyde, cinnamyl alcohol, methyl salicylate, and isopulegol and stereoisomers, enantiomers, positional isomers, diastereomers, cis/trans-isomers or epimers thereof.

16. A preparation or semi-finished product, comprising an inclusion product as claimed in claim 11.

17. The preparation or semi-finished product as claimed in claim 16, wherein the total content of the inclusion product, relative to the total weight of the preparation or semi-finished product, is 0.001 through 10 wt. %.

18. A process for producing a flavoring material inclusion product, comprising:
   (i) preparing a mixture of a maltodextrin fraction as claimed in claim 1 in water at a pH of 5-9, wherein the dry content of the maltodextrin fraction in the mixture is 5-50 wt. %;
   (ii) heating the mixture to 50-100° C. at max. 1080 hPa, so that at least 70 wt. % of the maltodextrin fraction is dissolved;
   (iii) cooling the solution obtained in step (ii) to a maximum temperature of 1-30° C. to produce a dispersion of retrograded maltodextrin; and
   (iv) adding the one or more flavoring materials to be included to the solution before or during step (iii).

19. The retrograded isolated maltodextrin fraction as claimed in claim 1, wherein
   a) the isolated maltodextrin fraction is water-soluble to more than 99 wt. % at a temperature of 50-100° C. and 1013 hPa and a pH from 7, or
   b) a dispersion of 25 wt. % of the isolated maltodextrin fraction in 75 wt. % water at pH 7, after retrogradation and storage at rest for 24 h at 5° C., has a viscosity of 20-400 mPas, wherein the viscosity is measured at 25° C., 1013 hPa with a plate-on-plate viscosimeter and a shear rate of $1000 \text{ s}^{-1}$.

20. The retrograding maltodextrin fraction as claimed in claim 1, wherein the maltodextrin fraction comprises a maximum content of non-retrograded maltodextrin of 0.2-20 wt. %, relative to the total maltodextrin fraction.

* * * * *